United States Patent
Lacko

(10) Patent No.: US 9,714,627 B2
(45) Date of Patent: Jul. 25, 2017

(54) MOUNTING OF AIRCRAFT PROPULSION SYSTEM OUTER SLEEVE AND INNER STRUCTURE TO PYLON WITH DISTINCT HINGES

(71) Applicant: ROHR, INC., San Diego, CA (US)

(72) Inventor: Anthony Lacko, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 663 days.

(21) Appl. No.: 14/081,125

(22) Filed: Nov. 15, 2013

(65) Prior Publication Data

US 2015/0136875 A1    May 21, 2015

(51) Int. Cl.
| | | |
|---|---|---|
| F02C 7/20 | (2006.01) | |
| B64D 29/06 | (2006.01) | |
| F02K 1/70 | (2006.01) | |
| F02K 1/82 | (2006.01) | |

(52) U.S. Cl.
CPC ............... *F02K 1/70* (2013.01); *B64D 29/06* (2013.01); *F02C 7/20* (2013.01); *F02K 1/827* (2013.01); *F05D 2240/14* (2013.01); *F05D 2260/963* (2013.01); *Y02T 50/672* (2013.01)

(58) Field of Classification Search
CPC .... F02C 7/045; F02C 7/20; F02K 1/64; F02K 1/70; F02K 3/06; B64C 7/02; B64D 27/12; B64D 27/14; B64D 29/00; B64D 29/06; B64D 2033/0206

See application file for complete search history.

(56) References Cited

U.S. PATENT DOCUMENTS

| | | | | |
|---|---|---|---|---|
| 4,683,717 A | * | 8/1987 | Naud ..................... | B64D 29/08 60/226.1 |
| 8,047,329 B1 | * | 11/2011 | Douglas ............... | G10K 11/172 181/292 |
| 2008/0258016 A1 | * | 10/2008 | Gukeisen ............... | B64D 29/00 244/53 R |
| 2009/0189013 A1 | * | 7/2009 | Hammer ................ | B64D 29/04 244/54 |
| 2010/0107599 A1 | * | 5/2010 | Vauchel ................. | B64D 29/08 60/226.2 |
| 2012/0001022 A1 | * | 1/2012 | Morvant ................ | B64D 29/02 244/1 N |
| 2012/0104161 A1 | * | 5/2012 | Shah ........................ | B64C 7/02 244/52 |
| 2013/0259641 A1 | * | 10/2013 | Stewart ................... | F01D 25/24 415/1 |
| 2014/0140820 A1 | * | 5/2014 | Todorovic ............. | F01D 11/005 415/144 |
| 2016/0083102 A1 | * | 3/2016 | James .................... | B64D 29/00 415/182.1 |

\* cited by examiner

*Primary Examiner* — Gerald L Sung
*Assistant Examiner* — Marc Amar
(74) *Attorney, Agent, or Firm* — Snell & Wilmer L.L.P.

(57) ABSTRACT

A propulsion system of an aircraft may include an inner fixed structure (IFS) and an outer sleeve. The IFS and the outer sleeve may be separately coupled to the pylon. The inner fixed structure may be hingeably coupled directly to the pylon with a first set of hinges defining a first axis of rotation. The outer sleeve may be hingeably coupled directly to the pylon with a second set of hinges, wherein the second set of hinges are distinct from the first set of hinges and define a second axis of rotation. Thus, portions of the pylon are exposed to the fan duct air flow path.

12 Claims, 6 Drawing Sheets

MOUNTING OF AIRCRAFT PROPULSION SYSTEM OUTER SLEEVE AND INNER STRUCTURE TO PYLON WITH DISTINCT HINGES

FIELD

The present disclosure relates to an aircraft engine nacelle, and more particularly, to the construction of the thrust reverser of such a nacelle.

BACKGROUND

A nacelle for a turbofan propulsion system on a typical commercial airliner is structure which surrounds the engine providing smooth aerodynamic surfaces for airflow around and into the engine. The nacelle also helps define a bypass air duct through the propulsion system. The nacelle may also include a thrust reverser which can deploy and provide reverse thrust to help slow the aircraft after touchdown. The thrust reverser structure is commonly provided in two halves which are separately mounted via hinges to either side of the propulsion system. The two halves can be unlatched and swung open to provide access to the engine for maintenance or other purposes.

SUMMARY

According to various embodiments, a propulsion system of an aircraft comprising a pylon, an inner fixed structure, and an outer sleeve are described herein. The inner fixed structure may be adapted to surround an engine core. The inner fixed structure may be mounted via at least a first hinge to the pylon. The outer sleeve may be mounted via at least a second hinge to the pylon. The inner fixed structure and the outer sleeve may be configured to help define a bypass air duct for bypass air from a fan. According to various embodiments, the inner fixed structure is hingeably coupled to the pylon with a first set of hinges defining a first axis of rotation, and the outer sleeve is hingeably coupled to the pylon with a second set of hinges. The second set of hinges may be distinct from the first set of hinges and define a second axis of rotation.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
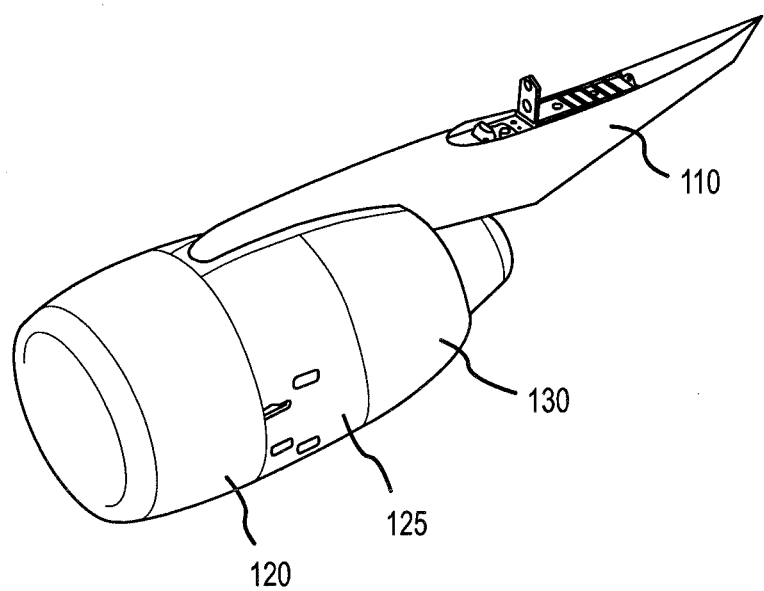
FIGS. 1A-1B depict a typical propulsion system and its elements.
Figure 1B:
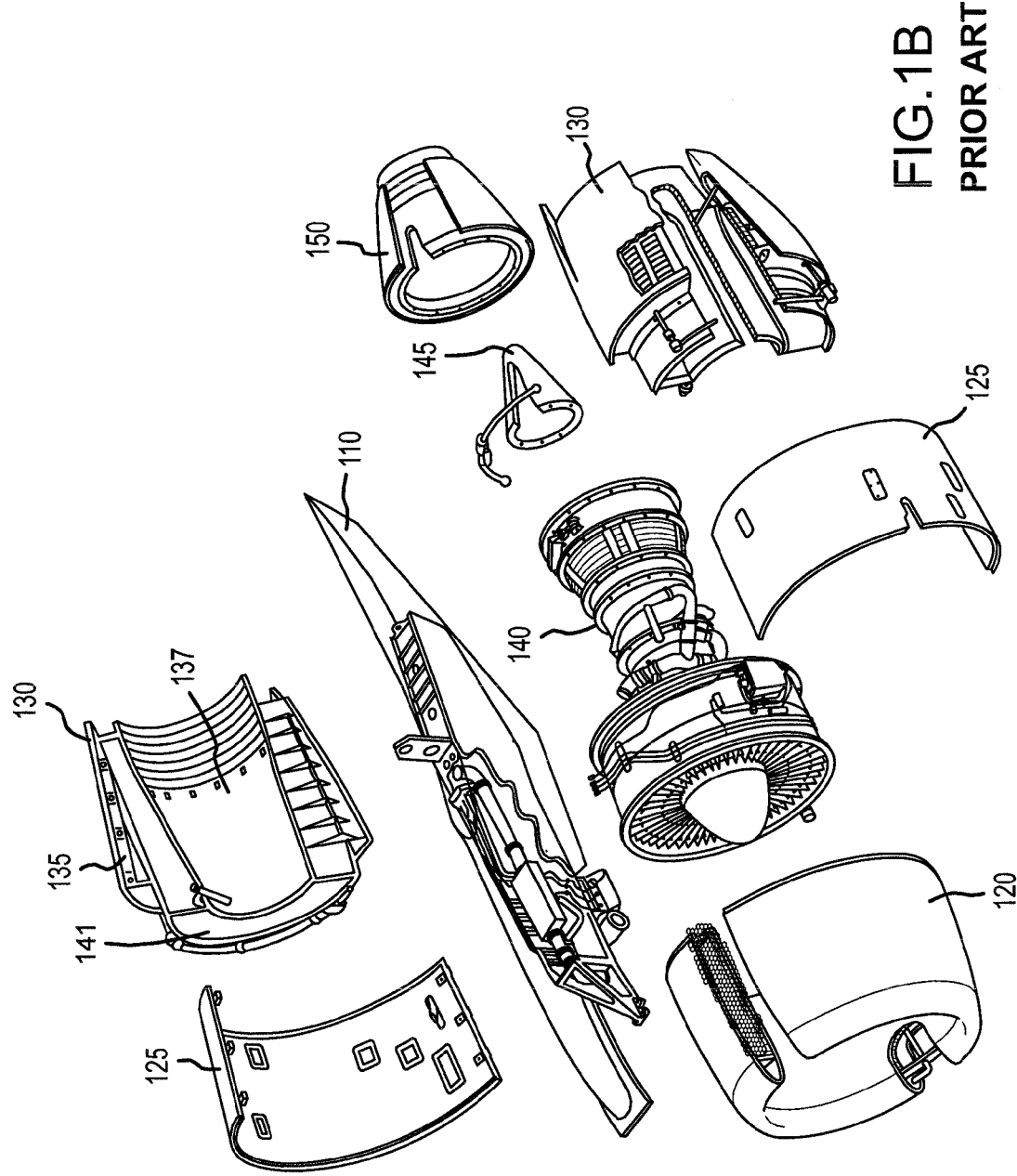

As depicted in FIGS. 1A and 1B, a typical turbofan propulsion system for a commercial jetliner may include an engine 140, pylon 110, and nacelle package. The typical nacelle package, or more simply a nacelle, may comprise an inlet 120, a fan cowl 125, a thrust reverser 130, and an exhaust system including an exhaust cone 145, and exhaust nozzle 150. The nacelle surrounds the engine providing smooth aerodynamic surfaces for airflow around and into the engine. The nacelle also helps define a bypass air duct through the propulsion system.

A fan draws and directs a flow of air into and through the propulsion system. After the fan, the air is divided into two principal flowpaths, one flowpath through the engine core, and another flowpath through a bypass air duct. The engine core flowpath is directed into the engine core and initially passes through a compressor that increases the air flow pressure, and then through a combustor where the air is mixed with fuel and ignited. The combustion of the fuel and air mixture causes a series of turbine blades at the rear of the engine core to rotate, and to drive the engine's rotor and fan. The high-pressure exhaust gases from the combustion of the fuel and air mixture are thereafter directed through an exhaust nozzle at the rear of the engine for thrust.

Figure 2A:
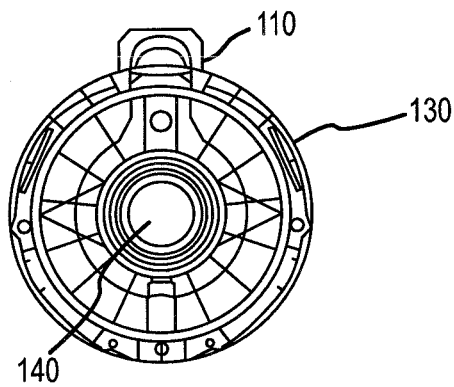
FIGS. 2A-2B depict a typical hinged opening of the thrust reverser.
Figure 2B:
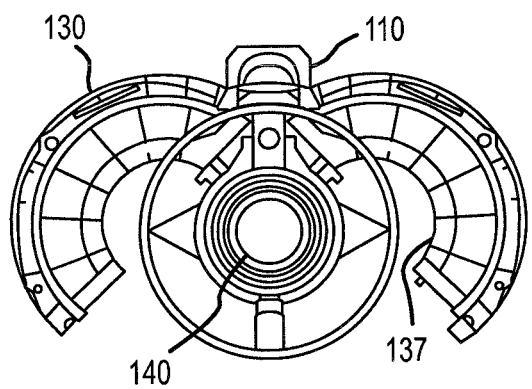
Figure 3:
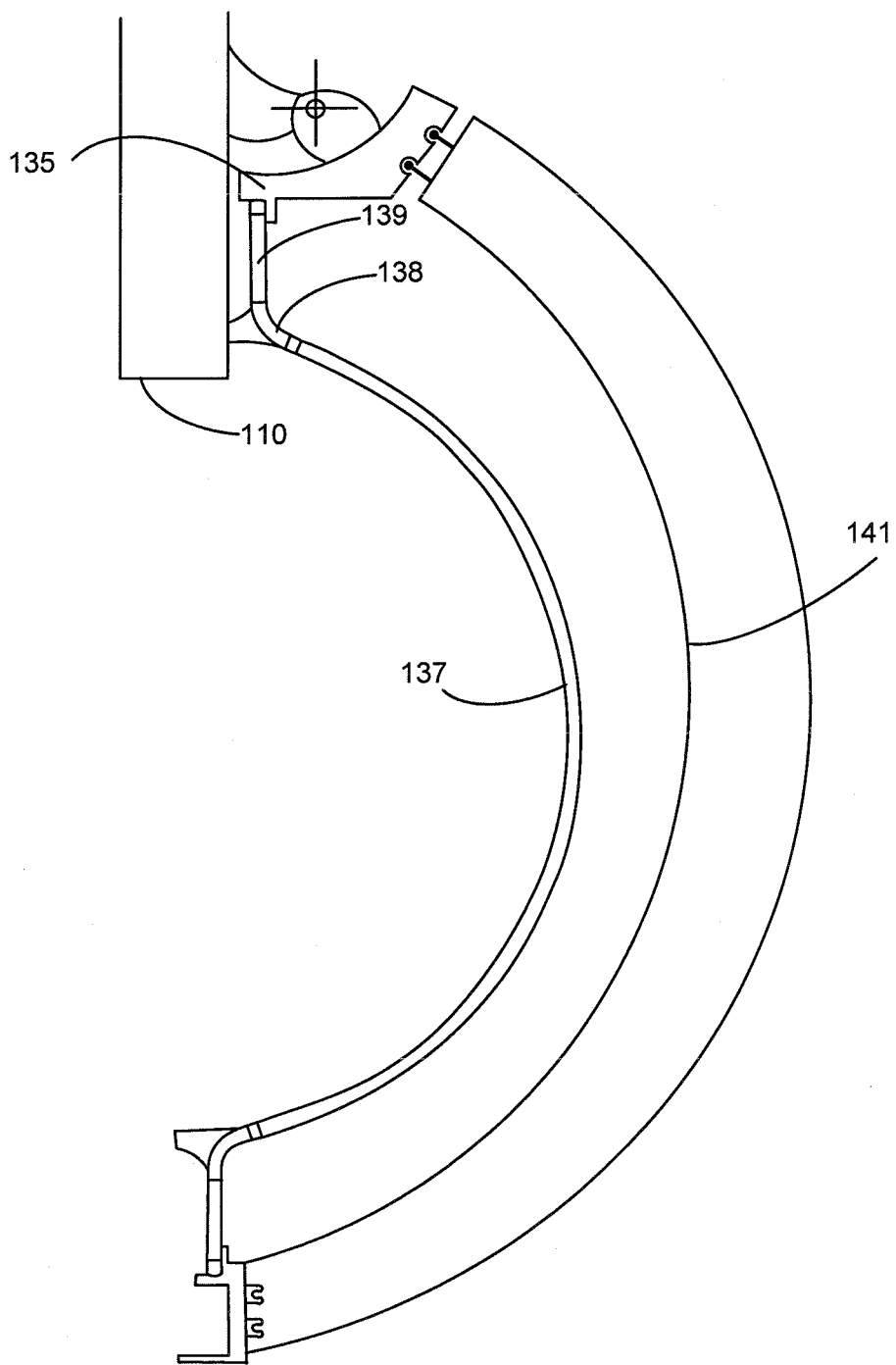
FIG. 3 depicts a typical inner fixed structure and hinge beam.

The bypass air flowpath includes air that is directed around the engine core in a duct or ducts defined by the nacelle. The bypass air exits the duct at a nozzle at the aft end of the nacelle for thrust. In turbofan engines, the bypass flow typically provides a large percentage of the thrust for an aircraft. The bypass air ducts in the nacelle in FIGS. 1-3 is C-shaped, and is principally defined by the exterior surface of the inner fixed structure and the inside surface of the outer sleeve 141. If the nacelle includes a typical thrust reverser, the thrust reverser blocks bypass air in the bypass air duct from reaching the nozzle, and instead redirects the bypass air to exit the duct in a forward direction of the aircraft to generate reverse thrust.

The engine 140 may be mounted to pylon 110 in two places. One of these at the aft end of the pylon 110, over the engine turbine case, and in one of two places at the forward end of pylon 110: the engine core (core mount) or the engine fan case (fan mount). Pylon 110 transmits structural loads (including thrust) between engine 140 and a wing.

The thrust reverser 130 may comprise two halves generally configured to surround the engine core. The thrust reverser 130 may be hinged to the pylon 110 via one or more hinges. This typical hinged attachment and relative hinging motion is depicted in FIGS. 2A-2B. The thrust reverser 130 comprises an inner fixed structure 137 and an outer sleeve. The inner fixed structure generally surrounds the engine core. As used herein, the outer sleeve, though it may have any shape, may generally be a C shaped structure. An exterior surface of the outer sleeve is external to the nacelle. An interior surface of the outer sleeve, along with the IFS, partially defines a cold flow path of the propulsion system of the aircraft. The inner fixed structure 137 and the outer sleeve are typically coupled together and attached to the pylon 110 via the same hinges. As used herein, the IFS is generally referred to as an IFS; however it should be appreciated that a first IFS half may be configured to partially surround an engine core and a second IFS half may be configured to substantially partially surround the remaining engine core. FIG. 3 depicts the typical inner fixed structure 137 and outer sleeve shape, and the manner in which they are typically attached to pylon 110. The inner fixed structure 137 may be rigidly attached to a hinge beam 135. The hinge beam 135 forms half of a hinge joint with structure attached to the pylon 110. The outer sleeve is also mounted to the hinge beam 135. For example, the hinge beam may include a pair of tracks that mount the outer sleeve so that the outer sleeve can slide axially aft during thrust reverser deployment.

As shown in FIG. 3, pylon 110 is entirely shielded from the fan flow path by the inner fixed structure 137 and the interior of the outer sleeve. The surface features of inner fixed structure 137 transitions from an annular shape to a linear shape at location 138 and is substantially parallel to a side surface of pylon 110 along location 139. For example, a side surface of pylon 110 may be a surface that spans from the nose of the pylon to the rear of the pylon in a direction parallel to the engine axis. The surface of inner fixed structure 137 generally both partially encapsulates a portion of the engine core and extends to the location of hinge beam 135.

Figure 4:
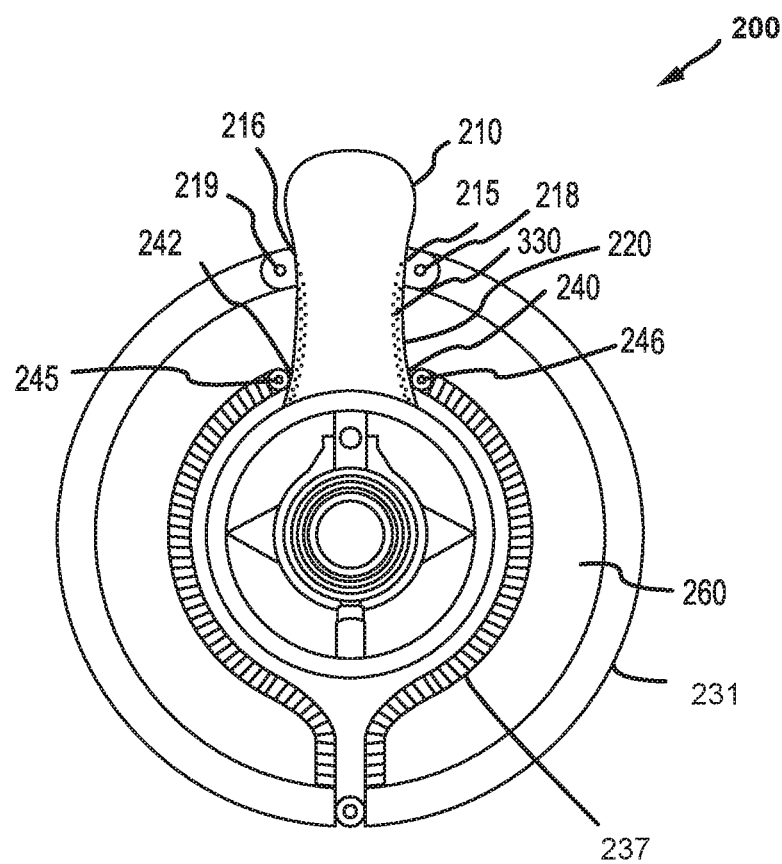
FIG. 4 depicts a separately attached inner fixed structure in accordance with various embodiments.

According to various embodiments and with reference to FIG. 4, the inner fixed structure 237 (IFS) and outer sleeve 231 are separately coupled to pylon 210. For instance, the inner fixed structure 237 and outer sleeve 231 may be hinged separately and attached to different parts and/or locations of pylon 210. These hinge locations may comprise non-coaxial and generally parallel axes of rotation. For instance, outer sleeve 231 may be hinged, via one or more hinges 218, 219 at locations 215, 216 of pylon 210 generally above locations 240, 242. Inner fixed structure 237 may be hinged, via one or more hinges 245, 246 generally at locations 240, 242 of pylon 210 generally below locations 215, 216. Hinges 218, 219 are not collocated with hinges 245, 246, nor are the axes of rotation of hinges 218, 219 coaxial with the axes of rotation of hinges 245, 246. The need for hinge beam 135 as depicted in FIG. 1B, may be eliminated in the design of system 200.

According to various embodiments, portions of 210 pylon are exposed to the bypass air flowpath 260. Pylon 210 may feature integral exterior surfaces that are smooth to provide an aerodynamic flow surface for the bypass air flowpath, or pylon 210 may comprise separate fairing surfaces attached to the exterior of the pylon to provide these smooth aerodynamic surfaces. Also, pylon 210 may include various acoustic features designed to attenuate sound in the bypass air flowpath 260. Unlike the configuration depicted in FIG. 3, the outer sleeve and the inner fixed structure are not integrally coupled together in system 200.

In system 200 the upper bifurcation may be thinner aerodynamically. Stated another way, the cross-sectional area blocked by structures in the bypass air flowpath are reduced. This may lead to increased engine efficiency and a more direct path for bypass air flowpath 260. Also, the engine system may experience less drag overall. Furthermore, according to various embodiments, the design of system 200 is well suited for an "O-duct" design (e.g. having no lower bifurcation) (not shown).

The substantially more cylindrical shape of IFS 237 may provide more direct load paths in system 200. This may reduce the size and weight of various support structures in the pylon and/or IFS 237 and/or outer sleeve 231. The substantially more cylindrical shape of IFS 237 may also reduce the magnitude and complexity of the stresses experienced by IFS 237. In particular, the forward edge (leading edge) of IFS 237 comprises a certain amount of stiffening structure to such that the IFS 237 does not deflect into the bypass air flowpath 260 and scoop the air into the engine compartment. The shape of the IFS 237 in FIG. 4 and the manner in which it is mounted to the pylon may inherently reduce deflections that could lead to scooping, thus requiring less stiffening structure and saving weight, and less stiffening structure may in turn result in an increase in acoustic treatments applied to the exterior of IFS.

The side surface of the pylon may be acoustically treated. For instance, portions of the pylon may comprise noise cancellation structures formed in the pylon that are positioned between the exterior surface of an inner fixed structure and the interior surface of an outer sleeve. The noise cancellation structures formed in a side surface of the pylon may be located between a hinge axis of rotation of the inner fixed structure and a hinge axis of rotation of the outer sleeve. These may be designed to attenuate noise in the bypass air flowpath.

Figure 5:
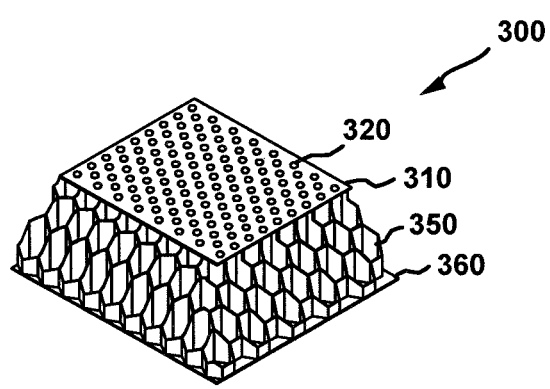
FIG. 5 depicts a noise suppression structure in accordance with various embodiments.

According to various embodiments and with reference to FIG. 5, the surfaces exposed to bypass air flowpath 260, such as pylon 210 side surface 220 may comprise a noise suppressing structure 330. The noise suppressing structure 330 may comprise, in various embodiments, any suitable structure for the suppression of noise. FIG. 5 illustrates an exemplary noise suppressing portion 300, which may be used in noise suppressing structure 330. For example, the noise suppressing structure 330 may comprise a latticework of hexagonal cells 350. Each cell 350 of the latticework may comprise a perforated 320 front face 310 and a (non-perforated) back face 360. A noise suppressing structure 300 may comprise a cavity formed in a core 350 of a composite material used to form structures of the nacelle. The suppressing structure 330 may attenuate sound, in a known manner, by reflecting sound waves out of the cavities in the core 350 which destructively interfere to reduce noise.

As shown in FIG. 4, the noise suppressing systems 300 may be integral to the pylon 210 surfaces, such as side surface 220. Stated another way, the materials integral to pylon 210, such as composite materials may comprise core 350. For instance, side surface 220 which, in conventional pylon 110 design, was shielded by the IFS 137 may be devoted to and/or treated with noise suppressing structure 330. Or, noise suppressing structure 330 may be applied to the exterior of the pylon 110 in a non-structural manner. The system designs described herein will not significantly decrease and/or eliminate acoustic surfaces that are available in a traditional design.

Though side surface 220 is depicted as spanning the Z direction at a slight curve, other angles and shapes of relief of side surface 220 of pylon 210 are contemplated herein. For instance, side surface 220 may be shaped such that it forms a surface honed for airflow, such as honed to increase efficiency of bypass airflow. Moreover, the structures disclosed herein may allow for both the IFS and outer sleeve to be simpler and/or more efficient components. The IFS and outer sleeve may also be lighter, for example by eliminating the hinge beam. The decoupling of the IFS and outer sleeve allows for the advancement of other designs, such as an O-duct design.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

What is claimed is:

1. A propulsion system of an aircraft comprising: a pylon adapted to be mounted to an aircraft; an inner fixed structure adapted to surround an engine core, the inner fixed structure mounted via at least a first hinge to the pylon; and an outer sleeve, the outer sleeve mounted via at least a second hinge to the pylon; wherein a side surface of the pylon is generally aerodynamically smooth, the side surface being located between the first hinge and the second hinge; and wherein the side surface of the pylon, the inner fixed structure and the outer sleeve help define a bypass air duct for bypass air from a fan, the side surface being exposed to a bypass air flowpath, wherein the side surface of the pylon spans an axial direction parallel to an engine axis and spans a radial direction perpendicular to the axial direction, the first hinge being spaced from the second hinge in the radial direction, and the side surface comprising a concave geometry along the radial direction at an axial location of the first hinge and the second hinge.

2. The propulsion system of claim 1, wherein the first hinge defines a first hinge axis, the second hinge defines a second hinge axis, and the first hinge axis and the second hinge axis are not coaxial.

3. The propulsion system of claim 2, wherein the first hinge axis and the second hinge axis are parallel.

4. The propulsion system of claim 3, wherein sound attenuating structures are at least partially disposed about the side surface of the pylon.

5. The propulsion system of claim 3, wherein the outer sleeve is adapted to be opened via the second hinge to gain access to the bypass air duct without opening the inner fixed structure.

6. The propulsion system of claim 5, wherein the side surface of the pylon is located between the first hinge axis and the second hinge axis.

7. A propulsion system of an aircraft comprising: a pylon; an inner fixed structure; and an outer sleeve, wherein the inner fixed structure is hingeably coupled directly to the pylon with a first set of hinges defining a first axis of rotation, and wherein the outer sleeve is hingeably coupled directly to the pylon with a second set of hinges, wherein the second set of hinges are distinct from the first set of hinges and define a second axis of rotation, a side surface of the pylon is exposed to a bypass air flowpath the side surface located between the first axis of rotation of the inner fixed structure and the second axis of rotation of the outer sleeve wherein the side surface of the pylon spans an axial direction parallel to an engine axis and spans a radial direction perpendicular to the axial direction, the first set of hinges being spaced from the second set of hinges in the radial direction, and the side surface comprising a concave geometry along the radial direction at an axial location of the first set of hinges and the second set of hinges.

8. The propulsion system of claim 7, wherein the first axis of rotation and the second axis of rotation are not coaxial.

9. The propulsion system of claim 8, wherein the first axis of rotation of the inner fixed structure and the second axis of rotation of the outer sleeve are parallel.

10. The propulsion system of claim 9, wherein sound attenuating structures are at least partially disposed about the side surface of the pylon.

11. The propulsion system of claim 9, wherein the side surface is generally aerodynamically smooth and helps define the bypass air duct.

12. The propulsion system of claim 4, wherein the sound attenuating structures comprise a perforated front face and a non-perforated back face.

\* \* \* \* \*